United States Patent [19]

Rubin

[11] Patent Number: 5,832,061
[45] Date of Patent: Nov. 3, 1998

[54] SYSTEM AND METHOD INCORPORATING A MOVER'S MAILBOX IN AN INTELLIGENT NETWORK

[75] Inventor: Robert Michael Rubin, Morristown, N.J.

[73] Assignee: Lucent Technologies Inc., Murray Hill, N.J.

[21] Appl. No.: 762,532

[22] Filed: Dec. 9, 1996

Related U.S. Application Data

[63] Continuation of Ser. No. 502,689, Jul. 14, 1995, abandoned.

[51] Int. Cl.$^6$ ..................................................... H04M 3/42
[52] U.S. Cl. ................................ 379/88; 379/67; 379/89; 379/207; 379/211
[58] Field of Search ............................... 379/201, 67, 88, 379/89, 211, 212, 213, 210, 207, 221, 214, 94, 69

[56] References Cited

U.S. PATENT DOCUMENTS

| | | | |
|---|---|---|---|
| 3,668,317 | 6/1972 | Vitalo | 379/207 |
| 4,053,949 | 10/1977 | Recca et al. | 379/112 |
| 4,837,798 | 6/1989 | Cohen et al. | 379/88 |
| 4,899,358 | 2/1990 | Blakley | 379/67 |
| 4,918,719 | 4/1990 | Daudelin | 379/214 |
| 5,255,315 | 10/1993 | Bushnell | 379/211 |
| 5,289,528 | 2/1994 | Ueno et al. | 379/211 |
| 5,329,578 | 7/1994 | Brennan et al. | 379/211 |
| 5,361,295 | 11/1994 | Solomon et al. | 379/211 |
| 5,394,445 | 2/1995 | Ball et al. | 379/142 |
| 5,450,476 | 9/1995 | D'Apuzzo et al. | 379/88 |
| 5,467,390 | 11/1995 | Brankley et al. | 379/210 |
| 5,475,737 | 12/1995 | Garner et al. | 379/214 |
| 5,479,495 | 12/1995 | Blumhardt | 379/207 |
| 5,548,636 | 8/1996 | Bannister et al. | 379/211 |
| 5,583,564 | 12/1996 | Rao et al. | 379/211 |
| 5,689,555 | 11/1997 | Sonnenberg | 379/211 |

*Primary Examiner*—Ahmad F. Matar
*Assistant Examiner*—Scott Wolinsky

[57] ABSTRACT

An intelligent network architecture is employed to handle calls placed to a network subscriber who has changed telephone numbers from an old telephone number to a new telephone number. In a preferred embodiment two call handling procedures are available: a call forwarding procedure, in which calls to the old number are automatically forwarded to the new number; and a messaging procedure, in which an announcement is played to the caller and the caller is invited to leave a message for the subscriber. Through a phone call the subscriber may switch call handling procedures, change the forwarding number, and/or change the messaging announcement.

10 Claims, 2 Drawing Sheets

SYSTEM AND METHOD INCORPORATING A MOVER'S MAILBOX IN AN INTELLIGENT NETWORK

This is a continuation of application Ser. No. 08/502,689, filed on Jul. 14, 1995 now abandoned.

TECHNICAL FIELD

This invention relates to communication networks, and more particularly to providing forwarding and messaging services to network subscribers who change their telephone number.

BACKGROUND OF THE INVENTION

Establishing telephone contact with a party who has changed telephone numbers presents a problem. In order for a caller to establish contact with such a party, the caller must have the party's new number. The new number may be communicated to the caller by means such as a letter, a person to person meeting, or a telephone call. However, communicating with a large number of prospective callers can be burdensome, and, moreover, there are no assurances that callers will retain the new number after it has been communicated.

One burden of communicating a party's new number to prospective callers is cost. An example of how costs are incurred when notifying prospective callers involves a dentist who changes phone numbers. Before the dentist's patients can call to make appointments, the dentist must expend the resources necessary to notify each patient of the new number. In particular, the dentist is likely to expend money on the labor required to send notification communications, for example, by employing a receptionist to mail notification postcards to the patients. In a more vivid example of how costs of notification are incurred, a multinational corporation employs a team of people to notify its present and prospective customers of a number change.

In any event, there is no guarantee that a caller notified of a new number will retain the new number, and repeated notifications may be necessary. The dentist example provides an illustration. In the dentist example a patient may use the new number to set up an appointment for a check-up, but forget or misplace the new number prior to setting up a subsequent appointment, thereby necessitating a second notification. Moreover, it is less likely for a caller to forget a number that the caller has been using over a long period of time. Thus, a period of repeated notification following a number change may be beneficial, if not necessary.

In light of the foregoing drawbacks in the present methods of handling calls to a party who changes telephone numbers, it is highly desirable to provide a system and method that can automatically notify a caller of a party's new telephone number whenever the caller dials the party's old telephone number, and that can notify the caller repeatedly for a period of time; or, alternatively, can make notification unnecessary.

SUMMARY OF THE INVENTION

The present invention provides a call handling system that overcomes the aforementioned drawbacks. The system can automatically notify callers of a party's new number, can notify them repeatedly, and can be alternatively configured to make notification of a party's new number unnecessary. Since changes to a subscriber's telephone number are often incidental to changes in the subscriber's residence, the present invention will be referred to from time to time as "mover's mailbox".

The invention employs an intelligent network configured to handle calls placed to an old telephone number of a subscriber who has changed to a new telephone number. The intelligent network includes a Service Switching Point (SSP), a Service Control Point (SCP), and a Service Management System (SMS). A call to a network subscriber is routed to the SSP which is used to detect mover's mailbox "triggers"—conditions which require the SSP to initiate mover's mailbox service. When a mover's mailbox trigger is detected the SSP querys the SCP for instructions on how to handle the call.

In a preferred embodiment of the invention, two alternate call handling procedures are employed. One call handling procedure that may be employed is a call forwarding procedure. In this procedure a forwarding number (e.g. the subscriber's new telephone number) is stored in the SCP and passed from the SCP to the SSP in response to the an SSP query. The SSP reroutes calls directed to the subscriber's old telephone number to the forwarding number. The alternative call handling procedure is a messaging procedure. In the messaging procedure, the SCP, in response to an SSP query, instructs the SSP to play an announcement to the caller, inviting the caller to leave a voice message. The caller's voice message is stamped with the date and time of the message and is stored for retrieval by the subscriber at the subscriber's convenience.

In the preferred embodiment, the subscriber can customize the mover's mailbox service according to the subscriber's wishes. Among the features which may be specified are: the call handling procedure to be used, the forwarding number to which calls should be re-routed in the forwarding procedure, and the announcement to be played in the messaging procedure. To implement the subscriber's feature specifications the subscriber is granted access to the SMS which formulates commands in response to the subscriber's specifications and then sends those commands to the SCP. The SMS commands direct the SCP to modify the stored subscriber instructions in accordance with the subscriber's specifications.

DETAILED DESCRIPTION

Figure 1:
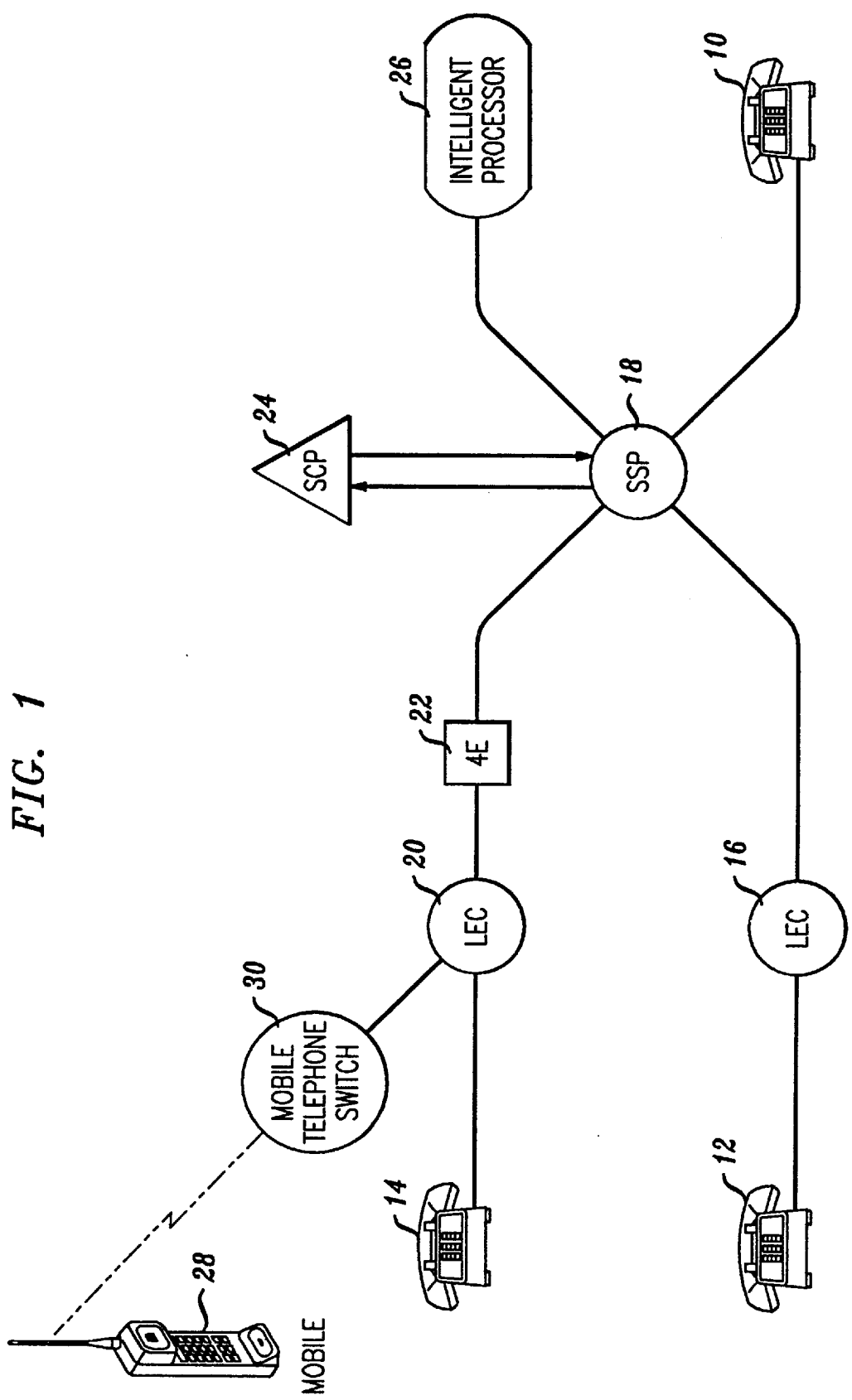
FIG. 1 is a block diagram of an exemplary network architecture suitable for implementing the present invention.

Before describing an exemplary embodiment of the invention, it will be useful to describe in a general manner the key intelligent network elements which can be used to implement the invention. Intelligent network components suitable for implementing the invention, in view of this disclosure, are well-known in the art and are commercially available from the AT&T Corporation ("AT&T") under the A-I-Net™ advanced intelligent network family of products.

The intelligent network architecture superimposes on an existing telecommunications system a modular configuration of network elements which provide enhanced telecommunications services. Switching functions are performed by the base network in a conventional manner. The intelligent network includes a service switching point (SSP), a service control point (SCP), and a service management system (SMS). The intelligent network may also include an intelligent processor. One skilled in the art will appreciate that the intelligent network elements could be owned or controlled by a local exchange carrier (LEC), an interexchange carrier (IXC), a competitive access provider, or some combination of the three.

The SSP is a switch that operates to recognize service requests, requests call handling instructions from an SCP, and executes those instructions to complete a telephone call. The SSP provides intelligent network "triggering"—detecting a condition which requires the SSP to initiate the intelligent network service by sending a query to the SCP. As described below, the mover's mailbox service of the invention has its own "trigger profile," or set of data, that assigns the service a unique point of entry into intelligent network functions. The SSP also formulates and transmits requests to the SCP and processes replies and requests from the SCP. In addition, the SSP creates and plays intelligent network announcements formulated by the service provider (e.g., the local exchange or inter-exchange carrier), and transmits event messages (such as busy or no reply signals) to the SCP. The SSP illustratively is an AT&T 5ESS® switch provisioned with AT&T's A-I-Net™ intelligent software to provide SSP functionality.

It should be noted that the SSP is capable of functions other than those mentioned above, such as processing billing records for a call. However, these "other functions" are beyond the scope of this invention, and therefore will not be described in detail.

The SCP is an intelligent network element which stores call control and call routing instructions to be executed by an SSP. It receives and processes event messages from the SSP, and formulates and sends responses to the SSP. In addition, the SCP processes accounting and statistical information, such as the Calling Party Number (CPN), the dialed intelligent network number, the time of day and day of the week of the call, and various other call parameters. An example of an SCP capable of implementing the foregoing functions is AT&T's A-I-Net™ SCP. The SCP interfaces with and receives commands for controlling services and service features from the SMS.

The SMS is a management and provisioning system that serves as an intelligent network service administration platform. The SMS formulates and sends commands to the SCP to control services and service features. An example of an SMS is the AT&T A-I-Net™ service management system.

The intelligent processor provides specialized functionality, such as speech recognition (identifying spoken words) and voice recognition (recognizing the voice of a particular speaker) capability. The intelligent processor also may perform the functions of a video signal generator or video signal database for applications such as providing images for use in a video telephone call forwarding service. The functionality of the intelligent processor may be implemented in a separate network element, or may be implemented through a multimedia SCP. As mentioned above, examples of services which may be provided by the intelligent processor are speech recognition and voice recognition. Other examples of services that may be offered through the intelligent processor include message recording, message erasing, voice digit dialing, and name dialing. Intelligent processor equipment suitable for use with the invention is well known in the art of intelligent network systems.

One area of intelligent call processing that merits special attention is the concept of "triggering." Triggering is the process by which a switch (e.g., an SSP) determines that a query message requesting call processing instructions will be sent to an SCP. A trigger is an occurrence of an event and/or the satisfaction of certain conditions which results in a message to the SCP. Triggers can be originating triggers, mid-call triggers, or terminating triggers. Examples of originating triggers are off-hook immediate, offhook delay triggers, and custom dialing plan triggers. An example of a mid-call trigger is the busy condition. An example of a terminating trigger is the ring-no answer condition. In the mover's mailbox procedures of the present invention a trigger is generated whenever a dialed number matches one of the numbers included in a list of "mover's numbers".

Having described in a general manner the function of the principal intelligent network elements, an exemplary network architecture suitable for implementing the present invention will now be described. The call forwarding procedure of the present invention will be described first, followed by a description of the messaging procedure.

Referring to FIG. 1, it is assumed, for purposes of illustration, that a subscriber has changed telephone numbers from an old telephone number to a new telephone number, the new telephone number being associated with a telephone station 10. It is also assumed that a call is placed to the subscriber's old telephone number from a caller that is using telephone station 14. In the call forwarding procedure, the call from telephone station 14 is routed to an SSP 18, which generates a query to an SCP 24 and forwards the call to telephone station 10 pursuant to instructions from the SCP.

Before continuing with a more detailed description of the call forwarding procedure it should be noted that there are many well known means for coupling telephone calls between telephone stations. Examples of such coupling means, all of which are suitable for use in the present invention, are: standard telephone lines, twisted shielded pair lines, coaxial cables, fiber optic lines, and wireless links. It should also be noted that various types of "calls" and various types of "telephone stations" fall within the scope of the invention. For example, a "call" may take the form of a data transmission from a computer or a fax transmission from a facsimile machine. Moreover, "telephone stations" to which calls are forwarded may include dedicated answering machines, such as a voice mailbox.

In any event, as described earlier, in the call forwarding procedure a call directed to a subscriber's old telephone number from telephone station 14 may be rerouted to telephone station 10, which is associated with the subscriber's new telephone number. This rerouting is performed in response to a "mover's mailbox" trigger.

Mover's mailbox triggers are generated when the SSP "recognizes" a dialed number to be an old number (i.e. a number that has been changed). To enable this type of triggering a list of changed numbers is stored in the SSP. Whenever a call is routed to the SSP, the SSP compares the dialed number to each number in the list of changed numbers, and if there is a match the SSP querys the SCP for a forwarding number. In the query, the SSP sends the dialed number so that the SCP can cross-reference the dialed number with the appropriate forwarding number for the called subscriber.

Thus, in the present example, the caller dials the subscriber's old number at telephone station 14. This call is routed to SSP 18 through a Local Exchange Carrier (LEC) switch 20 and a "4E" switch 22. Upon receiving the call, the SSP compares the dialed number to its list of changed numbers—which is supplied and maintained by the network operator. The SSP detects a match between the dialed number and a number in the list at which point a mover's mailbox trigger is generated. In response to the trigger, the SSP formulates a query that includes the dialed number and sends the query to an SCP 24.

The SCP is provisioned with a database containing service data for each subscriber. The data is subdivided into subscriber records with each subscriber record including the subscriber's old telephone number and a subscriber specified forwarding number. Upon receiving the query from the SSP, the SCP cross-references the dialed number with the database entry for the called subscriber, retrieves the forwarding number (i.e. the number of telephone station 10) from the subscriber's record, and passes the forwarding number to the SSP. The SSP receives the forwarding number and uses it to route the call to telephone station 10.

At this point it should be noted that communications between the SSP and SCP may be carried out over a Common Channel Signaling (CCS) network. CCS networks are well known in the art of telecommunications. They are generally used to communicate call control information among network elements, and they typically employ packet switching techniques to accomplish this task. The packet switches used in CCS networks are commonly referred to as Signal Transfer Points (STPs). In one possible implementation of a CCS, STPs are used in conjunction with CCS data links to pass call control information via a Signaling System 7 (SS7) protocol.

It should also be noted that calls may be routed to the SSP in a variety of ways. In addition to the scenario described above, FIG. 1 depicts two other possible scenarios. In one scenario a call is placed from a mobile phone 28 and is routed to SSP 18 through mobile telephone switch 30, LEC switch 20 and 4E switch 22. In another scenario a call is placed from telephone station 12 and is routed directly to SSP 18 through a LEC switch 16. For purposes of describing the messaging procedure it is once again assumed that the call is being placed from telephone station 14.

In the messaging procedure, like the forwarding procedure, the call from telephone station 14 is coupled to SSP 18 through LEC switch 20 and 4E switch 22. The SSP compares the dialed number to a list of changed numbers and generates a mover's mailbox trigger when the dialed number matches one of the numbers in the list. In response to the trigger, the SSP formulates a query that includes the dialed number and sends the query to the SCP. The SCP cross-references the dialed number to a subscriber record and retrieves the record. However, unlike the record in the call forwarding procedure, the record in the messaging procedure will include some indication that the messaging procedure, and not the forwarding procedure, is to be invoked. There are many types of messaging procedures suitable for use in the present invention. In one such procedure, the subscriber record includes instructions to play an announcement to the caller and to take a voice message.

The announcement and message taking may be conducted as follows. After retrieving the subscriber's record, the SCP instructs the SSP to couple the call to an Intelligent Processor IP) 26, such as an AT&T Voice Response Unit (VRU) or the Summa Four. The IP plays a voice message to the caller that informs the caller of the subscriber's new number and invites the caller to leave a message. If the caller decides to leave a message, the IP acts as a telephone answering machine, recording the voice message and appending a date and time stamp. Also, like an answering machine, the caller can hang up at any time.

In addition to the basic messaging offered above, the invention may include a caller ID feature. When caller ID is included, the Calling Party Number (CPN)—available through Automatic Number Identification (ANI)—will be converted to a voice signal and recorded as part of each subscriber message. If the caller leaves no message, the CPN will still be recorded and made available to the subscriber as a message. If the caller is using a privacy indicator, the word "private" will be substituted for the CPN in the subscriber message. If the CPN is not available, the subscriber will receive a message with the phrase "out of area".

A record update feature may also be offered through the present invention. This feature has applications in both the messaging and call forwarding procedures. In one possible application, the subscriber may change the call handling procedure used. In another possible application, the subscriber may change the announcement to be played to callers when the messaging procedure is operative. In a third possible application, the subscriber may change the forwarding number to which calls are forwarded when the call forwarding procedure is operative. One way in which these record updates may be implemented is through an SMS.

Figure 2:
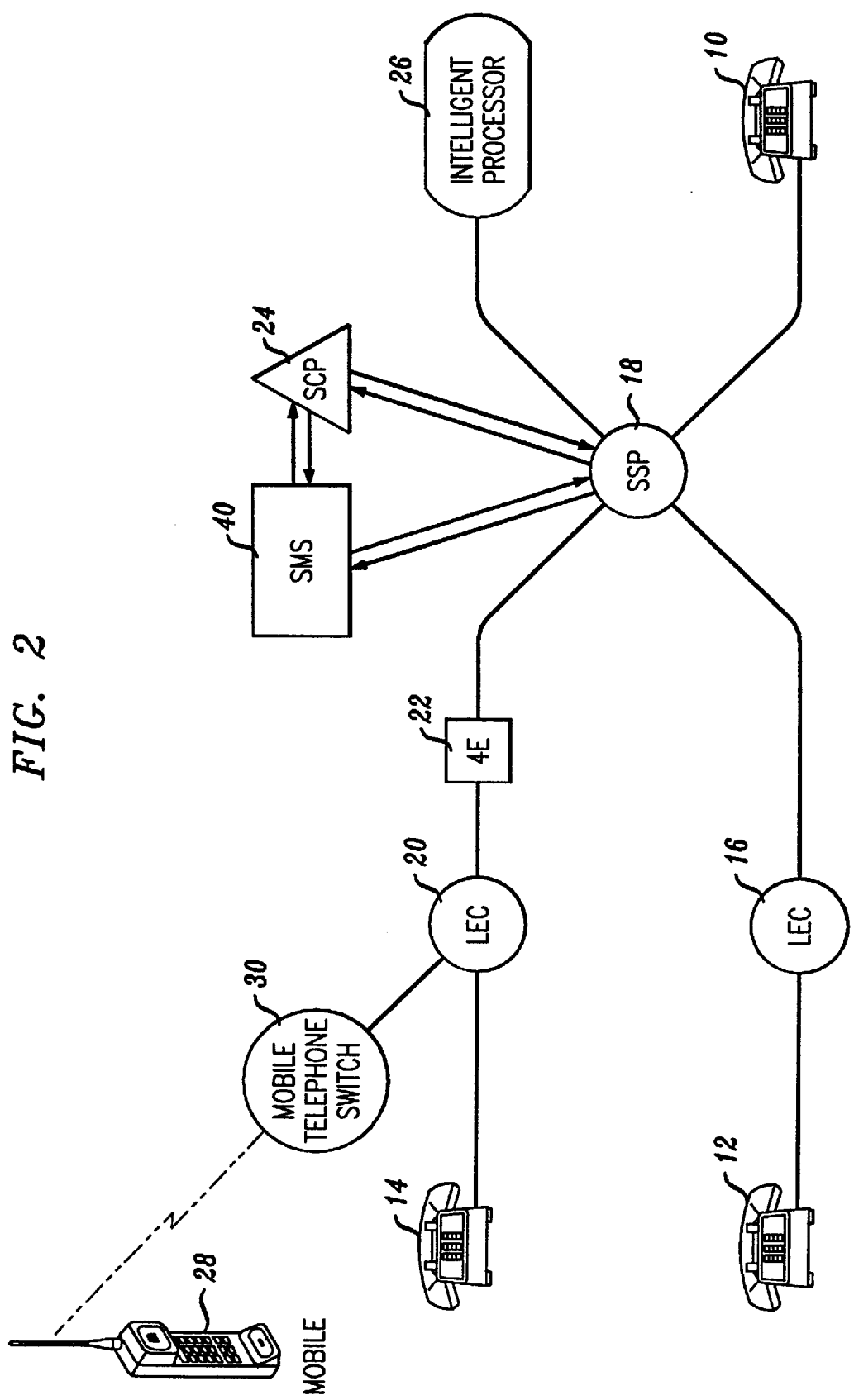
FIG. 2 is a block diagram of an exemplary network architecture that includes a Service Management System (SMS) and is suitable for implementing the present invention.

Referring to FIG. 2, there is shown a network architecture suitable for implementing the record update feature. The architecture is similar to the architecture of FIG. 1 with the exception of an additional element, an SMS 40. The SMS is accessed when updating a subscriber's record. To access the SMS a subscriber dials a 1-800 number, supplied to the subscriber by the network operator, and uses Dual Tone Multi Frequency Signaling (DTMF) to enter a Personal Identification Number (PIN), also supplied by the network operator. Once access is granted the subscriber may change the record.

Thus, for example, a subscriber dials the 1-800 number of SMS 40 and is coupled to the SMS through LEC switch 20, 4E switch 22, and SSP 18. The SMS then prompts the subscriber for a PIN, either directly or by initiating an announcement by IP 26. After the PIN is provided by the subscriber, the SMS prompts the subscriber to specify the type of update to be performed. The subscriber again uses DTMF signaling, this time to indicate that the messaging announcement will be changed. The SMS then prompts the subscriber for the new messaging announcement, in response to which the subscribe recites the desired announcement.

In another example, DTMF signaling is used to change the forwarding number. As in the previous example, the subscriber is connected to an SMS, enters a PIN, and indicates the type of update to be performed. However, in this case the subscriber indicates through DTMF signaling that the forwarding number will be changed. The subscriber then changes the forwarding number by entering DTMF digits in response to a prompt from the SMS.

In a third example, DTMF signaling is used to change the call handling procedure. The subscriber proceeds as in the prior two examples, but, when prompted for the type of update, indicates that the call handling procedure will be changed. When prompted for the desired procedure by the SMS, the subscriber enters one or more DTMF digits which have been predetermined to indicate the desired handling procedure. Thus, one predetermined digit combination serves as a messaging procedure indicator, while a second predetermined digit combination serves as a forwarding procedure indicator.

To give effect to a record update the record changes must be implemented in the SCP. Accordingly, after the requested changes (as exemplified above) have been received at the SMS, the SMS formulates one or more SCP commands, and sends the commands to SCP 24 where they are used to modify the stored subscriber instructions.

I claim:

1. A system for processing a telephone call placed by a caller to a telephone number of a called party that is no longer assigned to the called party and is no longer in service, comprising:

a) a Service Control Point (SCP) for storing a list of changed telephone numbers and a plurality of alternative call handling procedures;

b) a Service Switching Point (SSP) for generating a mover's mailbox trigger indicating that a call has been directed to one of said changed telephone numbers and querying said SCP to implement a selected one of said alternative procedures in response to said trigger, said selected procedure in one form providing a voice messaging service enabling said caller to record a voice message addressed to said called party; and c) a Service Management System (SMS) for formulating and sending commands to said SCP.

2. A system according to claim 1, further comprising an intelligent processor for playing announcements to said caller and for recording a voice message.

3. A system according to claim 2, wherein said intelligent processor provides speech recognition and voice recognition and further comprises:

means for inviting said caller to leave a voice message; and means for recording said voice message for later retrieval by said called party.

4. A system according to claim 2, wherein said intelligent processor further comprises:

means for acquiring a calling party number of said caller;

means for converting said calling party number to a voice signal; and means for appending said voice signal to said voice message.

5. A system according to claim 2, wherein said intelligent processor further comprises means for appending a date and time stamp to said voice message.

6. A method of processing a telephone call placed by a caller to a telephone number of a called party that is no longer assigned to the called party and is no longer in service, comprising the steps of:

a) comparing the telephone number to a list of changed telephone numbers stored in a telephone system;

b) generating a mover's mailbox trigger indicating that a call has been directed to one of said changed telephone numbers; and c) in response to said trigger, implementing a selected one of a plurality of alternative call handling procedures stored in said telephone system, said selected procedure in one form providing a voice messaging service enabling said caller to record a voice message addressed to said called party.

7. A method according to claim 6, further comprising the steps of:

playing announcements to said caller; and recording a voice message for later retrieval by said called party.

8. A method according to claim 7, wherein at least one of said announcements invite said caller to leave a voice message.

9. A method according to claim 7, further comprising the steps of:

acquiring a calling party number of said caller;

converting said calling party number to a voice signal; and appending said voice signal to said voice message.

10. A method according to claim 7, further comprising the step of appending a date and time stamp to said voice message.

* * * * *